United States Patent
Ceranton et al.

(10) Patent No.: US 12,294,743 B2
(45) Date of Patent: May 6, 2025

(54) DYNAMIC INSERTION OF CONTENT VIA MACROBLOCK MODIFICATION

(71) Applicant: MK Systems USA Inc., Wilmington, DE (US)

(72) Inventors: Freddy Ceranton, Rennes (FR); Mikael Le Guerroue, Rennes (FR); David Clewer, Southampton (GB)

(73) Assignee: MK Systems USA Inc., Wilmington, DE (US)

( * ) Notice: Subject to any disclaimer, the term of this patent is extended or adjusted under 35 U.S.C. 154(b) by 303 days.

(21) Appl. No.: 17/900,057

(22) Filed: Aug. 31, 2022

(65) Prior Publication Data
US 2023/0067258 A1  Mar. 2, 2023

(30) Foreign Application Priority Data

Sep. 1, 2021  (EP) .................................. 21306193

(51) Int. Cl.
*H04N 19/85*  (2014.01)
*H04N 19/105*  (2014.01)
(Continued)

(52) U.S. Cl.
CPC ........... *H04N 19/85* (2014.11); *H04N 19/105* (2014.11); *H04N 19/139* (2014.11);
(Continued)

(58) Field of Classification Search
CPC .. H04N 19/176; H04N 19/105; H04N 19/157; H04N 19/46; H04N 19/159;
(Continued)

(56) References Cited

U.S. PATENT DOCUMENTS

| | | | | |
|---|---|---|---|---|
| 6,167,162 A | * | 12/2000 | Jacquin | G06T 9/004 375/240.18 |
| 6,373,530 B1 | * | 4/2002 | Birks | H04N 21/426 348/584 |

(Continued)

FOREIGN PATENT DOCUMENTS

EP  0977439 A2  2/2000

OTHER PUBLICATIONS

European Patent Office, Communication, Extended European Search Report issued for European Application No. 21306193.0, dated Feb. 18, 2022, 11 pages.

(Continued)

*Primary Examiner* — Daniel Chang
(74) *Attorney, Agent, or Firm* — Norton Rose Fulbright US LLP

(57) ABSTRACT

This disclosure provides systems, methods, and devices for inserting content into a video frame. In one aspect, a frame of video data encoded to include a plurality of macroblocks is received. An insertion region of the frame for inserting content is defined, the insertion region spanning a subset of the macroblocks. The frame is augmented with a duplication region configured as a non-displayed region, the duplication region including duplicated macroblocks that duplicate the macroblocks of insertion region. The macroblocks of the insertion region are replaced with replacement macroblocks that encode replacement content.

14 Claims, 11 Drawing Sheets

(51) Int. Cl.
*H04N 19/139* (2014.01)
*H04N 19/167* (2014.01)
*H04N 19/172* (2014.01)
*H04N 19/176* (2014.01)
*H04N 19/517* (2014.01)
*H04N 19/593* (2014.01)

(52) U.S. Cl.
CPC ......... *H04N 19/167* (2014.11); *H04N 19/172* (2014.11); *H04N 19/176* (2014.11); *H04N 19/517* (2014.11); *H04N 19/593* (2014.11)

(58) Field of Classification Search
CPC .... H04N 19/172; H04N 19/11; H04N 19/593; H04N 19/174
See application file for complete search history.

(56) References Cited

U.S. PATENT DOCUMENTS

| | | | | |
|---|---|---|---|---|
| 8,238,420 | B1* | 8/2012 | Shankarappa | H04N 19/142 |
| | | | | 375/240.02 |
| 2003/0076363 | A1* | 4/2003 | Murphy | G06F 3/04842 |
| | | | | 715/800 |
| 2003/0112870 | A1* | 6/2003 | Fukuda | H04N 19/59 |
| | | | | 375/E7.137 |
| 2005/0047504 | A1* | 3/2005 | Sung | H04N 19/59 |
| | | | | 375/E7.211 |
| 2008/0178246 | A1 | 7/2008 | Blanchard | |
| 2009/0019491 | A1 | 1/2009 | Kulas | |
| 2010/0266045 | A1* | 10/2010 | Katzur | H04N 19/176 |
| | | | | 375/E7.125 |
| 2011/0235704 | A1* | 9/2011 | Kim | H04N 19/103 |
| | | | | 375/E7.126 |
| 2011/0292287 | A1* | 12/2011 | Washington | H04N 7/0152 |
| | | | | 348/E5.062 |
| 2015/0339234 | A1* | 11/2015 | Karandikar | G06F 12/0888 |
| | | | | 711/137 |
| 2021/0014496 | A1* | 1/2021 | Abe | H04N 19/157 |
| 2021/0044834 | A1* | 2/2021 | Li | H04N 19/176 |
| 2021/0105499 | A1* | 4/2021 | Lee | H04N 19/176 |
| 2023/0067258 | A1* | 3/2023 | Ceranton | H04N 19/85 |

OTHER PUBLICATIONS

Michalevsky, Y. et al. "Fast H.264 Picture in Picture (PIP) Transcoder with B-slices and Direct Mode Support," Melecon 2010-2010 15th IEEE Mediterranean Electrotechnical Conference, 2010, pp. 862-867, 6 pages.

Bordes, P. et al "SEI Message for Logo Insertion," Joint Video Team of ISO/IEC MPEG & ITU-T VCEG, Document JVT-Q019, 17th Meeting, Nice, France, Oct. 2005, 9 pages.

* cited by examiner

DYNAMIC INSERTION OF CONTENT VIA MACROBLOCK MODIFICATION

CROSS REFERENCE TO RELATED APPLICATIONS

This Application claims priority from European Patent Application No. 21306193.0, titled "Dynamic Insertion of Content Via Macroblock Modification," filed on Sep. 1, 2021, the disclosure of which is incorporated herein by reference in its entirety.

FIELD

This disclosure relates to video data, and more particularly relates to processing video data to provide enriched content.

BACKGROUND

When delivering video content to end users, such as via over-the-top media services, it may be desirable to modify or supplement source content to provide enriched content, e.g., to include logos, advertising, news updates, or the like. However, alteration of source content may face various challenges such as significant computing resources being required. Accordingly, there is need for alternate or improved ways to process source content to provide enriched content.

SUMMARY

In accordance with an aspect, there is provided a computer-implemented method for inserting content into a video frame. The method includes receiving a frame of video data encoded to include a plurality of macroblocks; defining an insertion region of the frame for inserting content, the insertion region spanning a subset of the macroblocks; augmenting the frame with a duplication region configured as a non-displayed region, the duplication region including duplicated macroblocks that duplicate the macroblocks of insertion region; and replacing the macroblocks of the insertion region with replacement macroblocks that encode replacement content.

In accordance with another aspect, there is provided a computer-implemented system for inserting content into a video frame. The system includes at least one processor; memory in communication with said at least one processor; software code stored in said memory, which when executed at the at least one processor causes the system to: receive a frame of video data encoded to include a plurality of macroblocks; define an insertion region of the frame for inserting content, the insertion region spanning a subset of the macroblocks; augment the frame with a duplication region configured as a non-displayed region, the duplication region including duplicated macroblocks that duplicate the macroblocks of insertion region; and replace the macroblocks of the insertion region with replacement macroblocks that encode replacement content.

In accordance with a further aspect, there is provided a non-transitory computer-readable storage medium storing instructions which when executed adapt at least one computing device to perform the method for inserting content into a video frame, described above.

Many further features and combinations thereof concerning embodiments described herein will appear to those skilled in the art following a reading of the instant disclosure.

BRIEF DESCRIPTION OF THE DRAWINGS

In the figures.

These drawings depict exemplary embodiments for illustrative purposes, and variations, alternative configurations, alternative components and modifications may be made to these exemplary embodiments.

DETAILED DESCRIPTION

Figure 1:
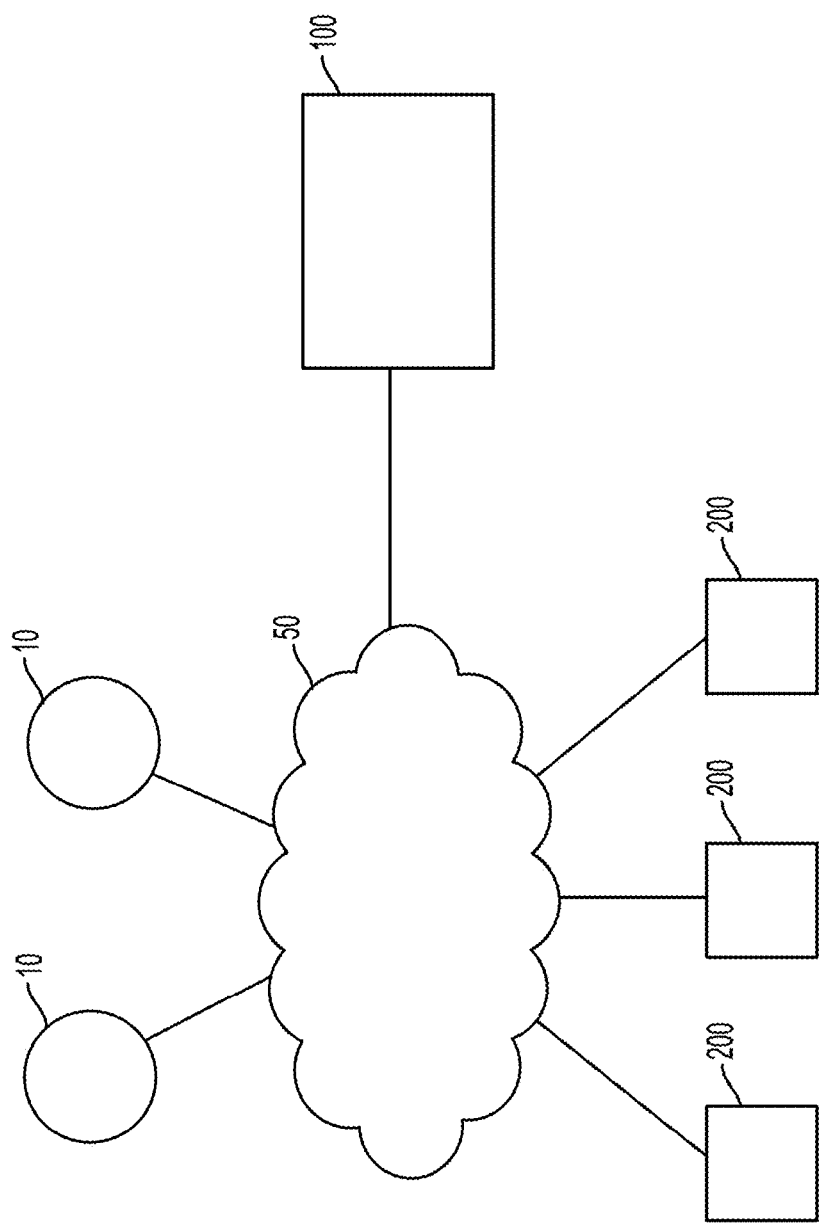
FIG. 1 is a network diagram of a media delivery service including a content insertion system, in accordance with an embodiment.

FIG. 1 is a diagram depicting a network environment of a media delivery service for delivering video content to end users, in accordance with an embodiment. As depicted, the network environment includes a content insertion system 100 interconnected with a plurality of content sources 10 and a plurality of client devices 200, by way of a communication network 50.

Content insertion system 100 receives source content from a content source 10 and processes it to generate enriched content. For example, content insertion system 100 generates enriched content by inserting replacement content into the source content, thereby replacing content in a spatial region of frames of the source content, as detailed herein. For example, content insertion system 100 may insert replacement content by replacing macroblocks in a spatial region of the frames.

In some embodiments, content insertion system 100 transmits enriched content directly to one or more client devices 200. In some embodiments, content insertion system 100 provides enriched content to a downstream component of the media delivery service (e.g., a content packaging component or a stream personalization component) for transmission to one or more client devices 200.

Various use of content insertion system 100 are contemplated. For example, embodiments of content insertion system 100 may be used to insert replacement content that is an advertisement, a watermark, a news update, a weather update, an emergency alert, or the like. In some embodiments, the replacement content may be selected to target a specific user or a specific class of users. In some embodiments, the replacement content may be selected to be relevant or complementary to the source content.

Embodiments of content insertion system 100 may produce various technical effects and provide various technical advantages. For example, in some embodiments, content insertion system 100 may generate enriched content while avoiding a need to fully decode source content frames or fully encode enriched content frames, which conserves computing resources. For example, in some embodiments, content insertion system 100 may generate enriched content in a manner that does not rely on content manifest manipulation, and thus is not susceptible to ad-blocking methods that detect such manipulation. For example, in some embodiments, content insertion system 100 processes each frame independently, and thus facilitates parallel processing of frames, thereby improving the rate at which enriched content may be generated.

Because content insertion system 100 replaces a portion of frames of the source content (i.e., a spatial portion of the source content), some embodiments of content insertion system 100 conveniently allow replacement content to be inserted at any point of the source content. In some embodiments, content insertion system 100 allows replacement content to be presented for the entire duration of the source content.

In some embodiments, content insertion system 100 generates enriched content in a reversible manner, such that the source content may be substantially recovered by processing the enriched content. Reversibility may be desirable so that the source content may be recovered at a client device 200, e.g., for archival purposes or for later playback without inserted content.

Referring again to FIG. 1, in the depicted embodiment, each content source 10 may be a conventional source of video content (including audio-video content) such as, for example, a television station or an Internet live stream. For example, a content source 10 may receive linear content by way of a satellite signal, a radio frequency (RF) antenna signal, or a dedicated portion of network 50. The received linear content is encoded by a plurality of encoders into multiple bitrates and multiple formats. As will be appreciated, for live broadcasts, encoding is performed in real time or near real time. Encoders may reside at a content source 10. For example, encoders may reside at a content source that is a local television station affiliate. Encoders may also be remote from a content source 10, and be connected therewith by network 50. Encoded content, in various bitrates and formats, is transmitted from the encoders to content insertion system 100.

Each client device 200 is a device operable by an end user to play streamed video content. For example, a client device 200 may be a digital media player, a set-top box, a video game console, each connected to a display device for playing streamed content. A client device 200 may also be SmartTV device or a personal computing device such as a laptop computer, a tablet computer or a smartphone, each having an integrated display screen.

Network 50 may include a packet-switched network portion, a circuit-switched network portion, or a combination thereof. Network 50 may include wired links, wireless links such as radio-frequency links or satellite links, or a combination thereof. Network 50 may include wired access points and wireless access points. Portions of network 50 could be, for example, an IPv4, IPv6, X.25, IPX or similar network. Portions of network 50 could be, for example, a GSM, GPRS, 3G, LTE or similar wireless networks. Network 50 may include or be connected to the Internet. When network 50 is a public network such as the public Internet, it may be secured as a virtual private network.

In the depicted embodiment, portions of network 50 interconnecting content streaming system 100 with client devices 200 are adapted for transmission of video streams (including audio-video streams) over HTTP. In other embodiments, other protocols may be used for transmission of video streams.

Figure 2:
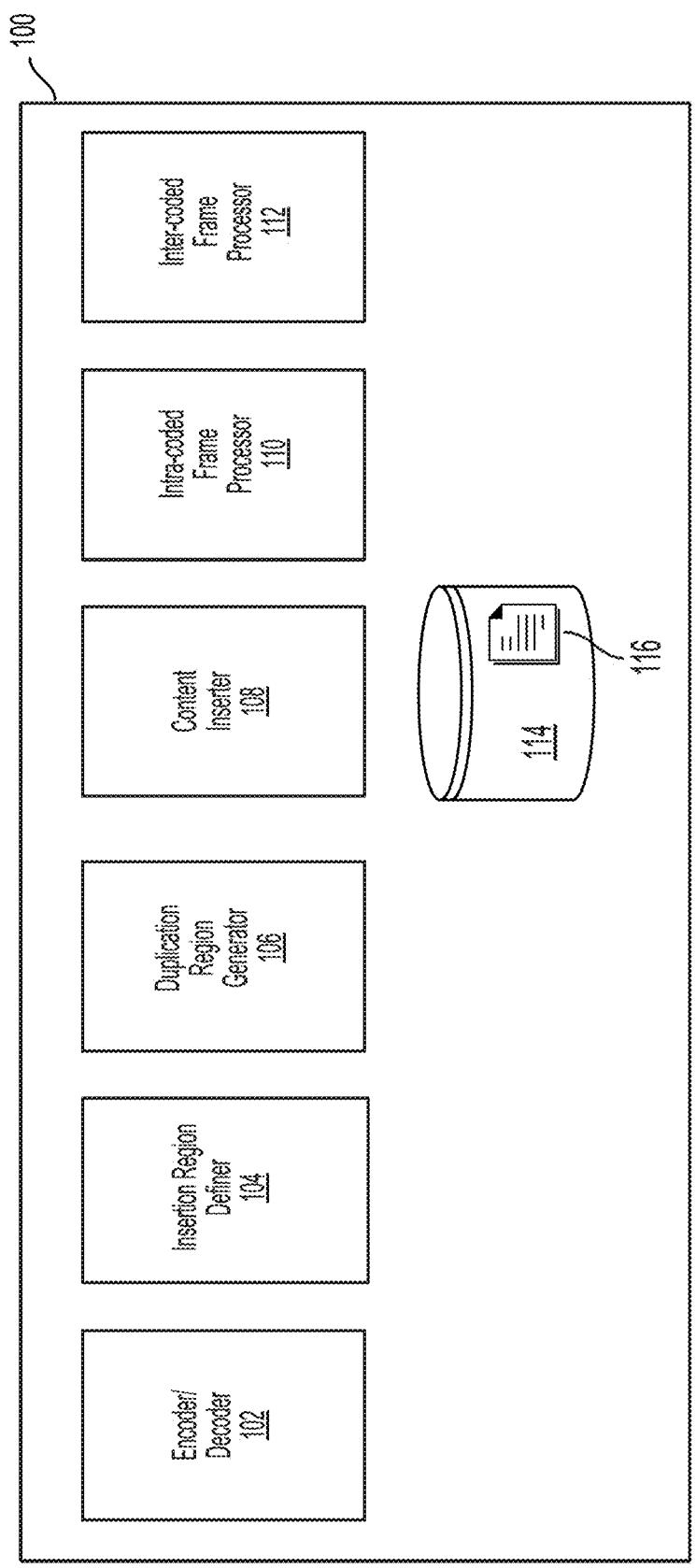
FIG. 2 is a schematic diagram of the content insertion system of FIG. 1, in accordance with an embodiment.

FIG. 2 is a high-level schematic of content insertion system 100, in accordance with an embodiment. As depicted, content insertion system 100 includes an encoder/decoder 102, an insertion region definer 104, a duplication region generator 106, a content inserter 108, an intra-coded frame processor 110, an inter-coded frame processor 112, and a replacement content data store 114.

As noted, content insertion system 100 receives source content from one or more data sources 10. Such source content may be encoded using a variety of encoding methods such as block-based encoding methods which partition each frame into a plurality of blocks of pixel which may be referred to as macroblocks. For example, in some embodiments, the block-based encoding methods may apply block motion compensation (e.g., motion-compensated discrete cosine transform). For example, in some embodiments, the block-based encoding methods may apply hybrid block-based motion-compensated encoding. Other block-based encoding methods may also be used, as will be apparent to a person of ordinary skill in the art.

Source data may be encoded to include a plurality of intra-coded frames that are coded independently of other frames (e.g., I frames) and a plurality of inter-coded frames that are coded using motion-compensated difference information relative to other frames (e.g., P frames and/or B frames).

The depicted embodiment is described with reference to source data that is encoded using H.264/AVC coding. However, this embodiment and other embodiments may also be used with other types of encodings such as, for example, MPEG-2, H.265/HEVC, or the like. In some embodiments, encoder/decoder 102 may include a conventional entropy encoder and decoder.

In the depicted embodiment, source content is partially decoded by encoder/decoder 102. In particular, source data frames are partially decoded only to the extent required to insert replacement content in manners described herein. Similarly, only parts of frame need to be encoded to generate enriched content in manners described herein.

In some embodiments, source content may be encrypted and encoder/decoder 102 may apply appropriate decryption to the source content, to allow the source content to be processed as contemplated herein. In some embodiments, enriched content may need to be encrypted and encoder/decoder 102 may apply appropriate encryption before the enriched content is transmitted from content insertion system 100. Accordingly, encoder/decoder 102 may implement various conventional decryption and/or encryption methodologies including key management systems.

Insertion region definer 104 defines an insertion region in one or more frames of source content, where replacement content will be inserted. The insertion region is defined to span a subset of the macroblocks in each frame.

Figure 3:
FIG. 3 shows an example video frame with an insertion region defined, in accordance with an embodiment.

For example, FIG. 3 depicts a frame 300 with an insertion region 302 defined therein, in accordance with an embodiment. As depicted, frame 300 has a width of 30 macroblocks and a height of 14 macroblocks. In this frame, insertion region definer 104 defines an insertion region 302 having a width of 14 macroblocks and a height of 2 macroblocks. As will be appreciated, the number of macroblocks in frame 300 and insertion region 302 are provided as examples only, and may vary. Insertion region 302 may be defined to include any subset of the macroblocks of frame 300. For example, insertion region 302 may be defined to include a single macroblock. Insertion region 300 may be defined to have a size corresponding to the pixel size of replacement content to be inserted. Although FIG. 3 depicts only one insertion region 302, in some embodiments, insertion region definer 104 may define multiple insertion regions 302.

Duplication region generator 106 modifies a frame (e.g., frame 300) to provide a duplication region for maintaining a duplicate of macroblocks in an insertion region (e.g., insertion region 302). In this way, macroblocks in the insertion region are preserved and may be referenced (e.g., spatially or temporally), even after these macroblocks are replaced or otherwise altered to include replacement content.

Figure 4:
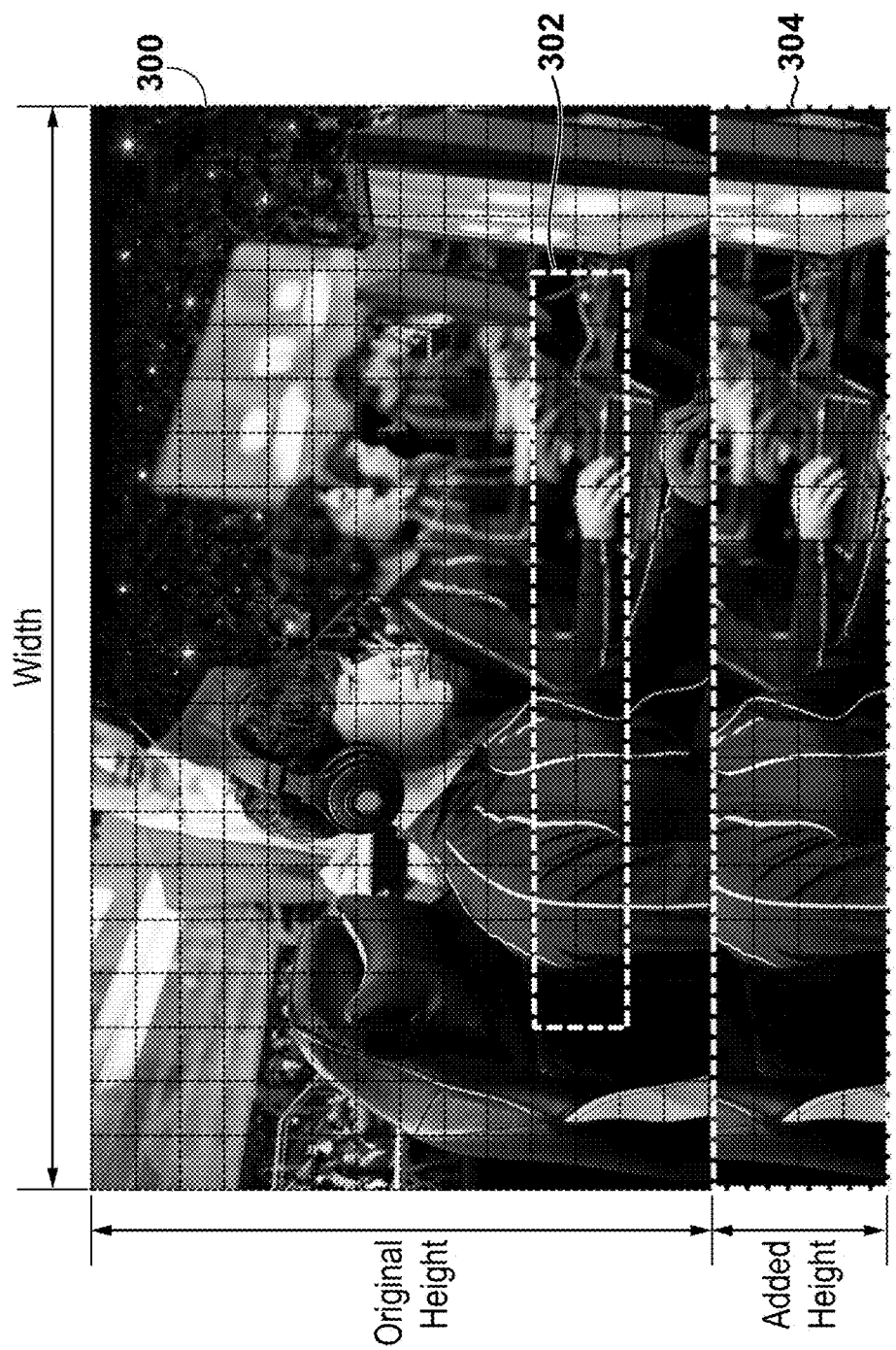
FIG. 4 shows the frame of FIG. 3 augmented to include a duplication region, in accordance with an embodiment.

FIG. 4 shows frame 300 modified to include a duplication region 304, in accordance with an embodiment. As depicted, frame 300 has been augmented by duplication region generator 106 to include duplication region 304 at the bottom of frame 300, thereby enlarging the frame. Duplication region 304 has a width of 30 macroblocks and a height of 4 macroblocks. Duplication region 304 is sized to fit all of the macroblocks of insertion region 302 and additional macroblocks in a pre-defined region adjacent insertion region 302, which may be referred to herein as the adjacent macroblocks. For example, in FIG. 4, the height of duplication region 304 is defined to be the height of insertion region 302 plus a vertical margin of one macroblock above and below insertion region 302. Further, the width of duplication region 304 is defined to be the width of frame 300 to maintain a rectangular shape of frame 300. So, duplication region 304 has at least one of (i) a height greater than a height of insertion region 302 or (ii) a width greater than a width of insertion region 302.

Duplication region generator 106 populates duplication region 304 with data from the macroblocks of insertion region 302 and the aforementioned additional macroblocks in the pre-defined region adjacent insertion region 302. For example, duplication region generator 106 copies data from a first memory region storing data defining the macroblocks of insertion region 302 and the adjacent macroblocks to a second memory region storing data defining the macroblocks of duplication region 304.

For example, when the frame is an intra-coded frame, duplication region 304 is populated to include an intra-coded duplicate of the macroblocks of insertion region 302 and the adjacent macroblocks. Duplication region generator 106 implements changes to macroblock syntax for intra mode signaling.

Of note, duplication region generator 106 only needs the frame decoded (e.g., by encoder/decoder 102) until the end of insertion region 302 and the adjacent macroblocks that need to be duplicated. Conveniently, decoding of the entire frame may be avoided and decoding may be terminated before the end of the frame is reached. When the frame is an inter-coded frame, duplication region 304 is populated to include a duplicate of the macroblocks of insertion region 302 and the adjacent macroblocks.

For inter-coded frames, duplication region 304 does not need decoded portions of the frame preceding the insertion region and preceding the adjacent macroblocks that need to be duplicated, or the portions of the frame that follow. In some embodiments, for example, the frame only needs to be decoded to the extent required to retrieve the motion vectors for subsequent processing steps. Again, conveniently, decoding of the entire frame may be avoided and decoding may be terminated before the end of the frame is reached.

In some embodiments, duplication region generator 106 only copies data into duplication region 304 from a portion of the macroblocks adjacent insertion region 302 and may set other macroblocks to a default or null value. For example, duplication region generator 106 may omit duplicating data for some adjacent macroblocks that are distant to insertion region 302 and thus are unlikely to be referenced during subsequent processing steps.

Duplication region generator 106 configures duplication region 304 to be a non-displayed region, e.g., so that it is not displayed at client devices 200. In some embodiments, duplication region generator 106 configures duplication region 304 to be a non-displayed region by setting a cropping parameter for the frame. For example, when the frame is encoded using H.264/AVC coding, duplication region generator 106 updates the sequence parameter set (SPS) "frame_crop_bottom_offset" parameter and the "frame_cropping_flag" to configure duplication region 403 to be a non-displayed region.

Content inserter 108 inserts replacement content into insertion region 302. In the depicted embodiment, content inserter 108 replaces macroblocks inside the insertion region 302 with intra-predicted macroblocks corresponding to replacement content. As noted, replacement content may be advertising, watermarks, news updates, weather updates, emergency alerts, or the like.

As will be appreciated, intra-predicted macroblocks may be inserted into insertion region 302 regardless of whether frame 300 is an inter-coded frame or an intra-coded frame.

In some embodiments, content inserter 108 may use data defining the replacement macroblocks from prior created macroblock replacement assets 116, which may be stored or identified in an electronic data store 114. In some embodiments, content inserter 108 may retrieve data defining the replacement macroblocks from a remote location.

Figure 5:
FIG. 5 shows the frame of FIG. 3 with macroblocks of replacement content inserted into its insertion region, in accordance with an embodiment.

FIG. 5 shows frame 300 with macroblocks of replacement content 306 inserted into insertion region 302, in accordance with an embodiment.

Intra-coded frame processor 110 processes intra-coded frames to remove spatial references between macroblocks to accommodate insertion of replacement content into insertion region 302. For example, in an intra-coded frame 300, spatial references of macroblocks inside insertion region 302 to macroblocks outside the insertion region 302 are removed. Similarly, spatial references of macroblocks outside insertion region 302 to macroblocks inside insertion region 302 are also removed. In some embodiments, spatial references may be removed by using particular intra-prediction modes for particular macroblocks that do not use undesired spatial references.

Figure 6:
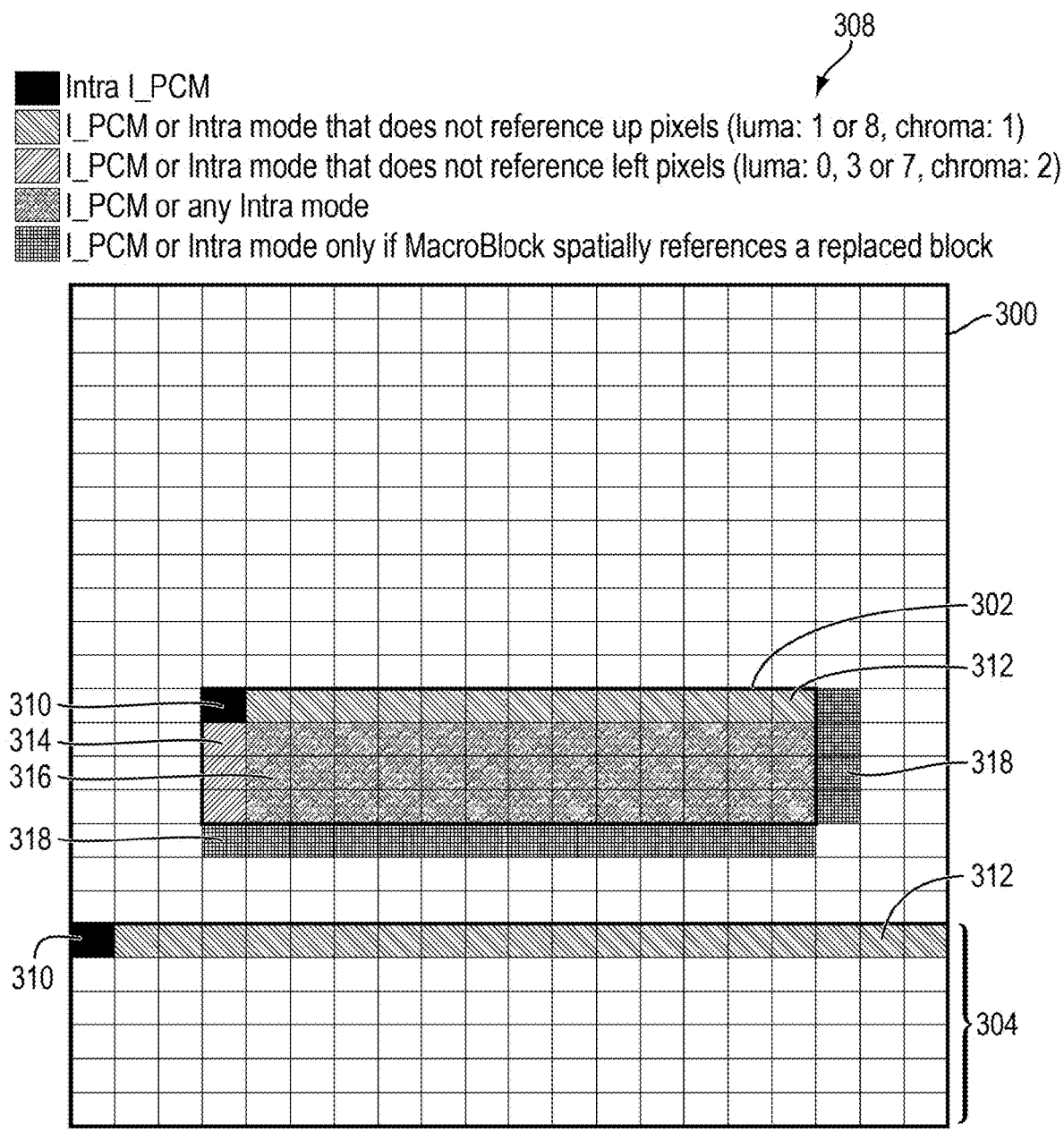
FIG. 6 is a schematic diagram that shows breaking a spatial reference, in accordance with an embodiment.

FIG. 6 shows particular intra-prediction modes for an intra-coded frame 300 encoded using H.264/AVC coding, in accordance with an embodiment. For example, per legend 308, the following prediction modes are used for macroblocks in insertion region 302:

an intra I_PCM (Intra-Pulse Code Modulation) prediction mode is used for macroblock 310;

I_PCM or an intra mode that does not reference up pixels (e.g., intra mode luma: 1 or 8, chroma: 1) is used for macroblocks 312;

I_PCM or an intra mode that does not reference left pixels (e.g., intra mode luma: 0, 3, or 7, or chroma: 2) is used for macroblocks 314;

I_PCM or an intra mode is used for macroblocks 316; and

I_PCM or an intra mode is used for macroblocks 318, which is only necessary if a macroblock 318 references a pixel in insertion region 302.

As depicted in FIG. 6, intra-coded frame processor 110 also removes spatial references in duplication region 304 in a similar manner. For example, per legend 308, the following prediction modes is for macroblocks in duplication region 304:

an intra I_PCM (Intra-Pulse Code Modulation) prediction mode is used for macroblock 310; and I_PCM or an intra mode that does not reference up pixels (e.g., intra mode luma: 1 or 8, chroma: 1) is used for macroblocks 312.

In accordance with legend 308, if no prediction not is specified then any prediction mode may be used.

Inter-coded frame processor 112 processes inter-coded frames to remove temporal references between macroblocks to accommodate insertion of replacement content into insertion region 302. For example, inter-coded frame processor 112 identifies inter-predicted macroblocks that include a temporal reference to a macroblock in insertion region 302, and breaks the reference and creates a new reference to a corresponding duplicated macroblock in duplication region 304.

Figure 7:
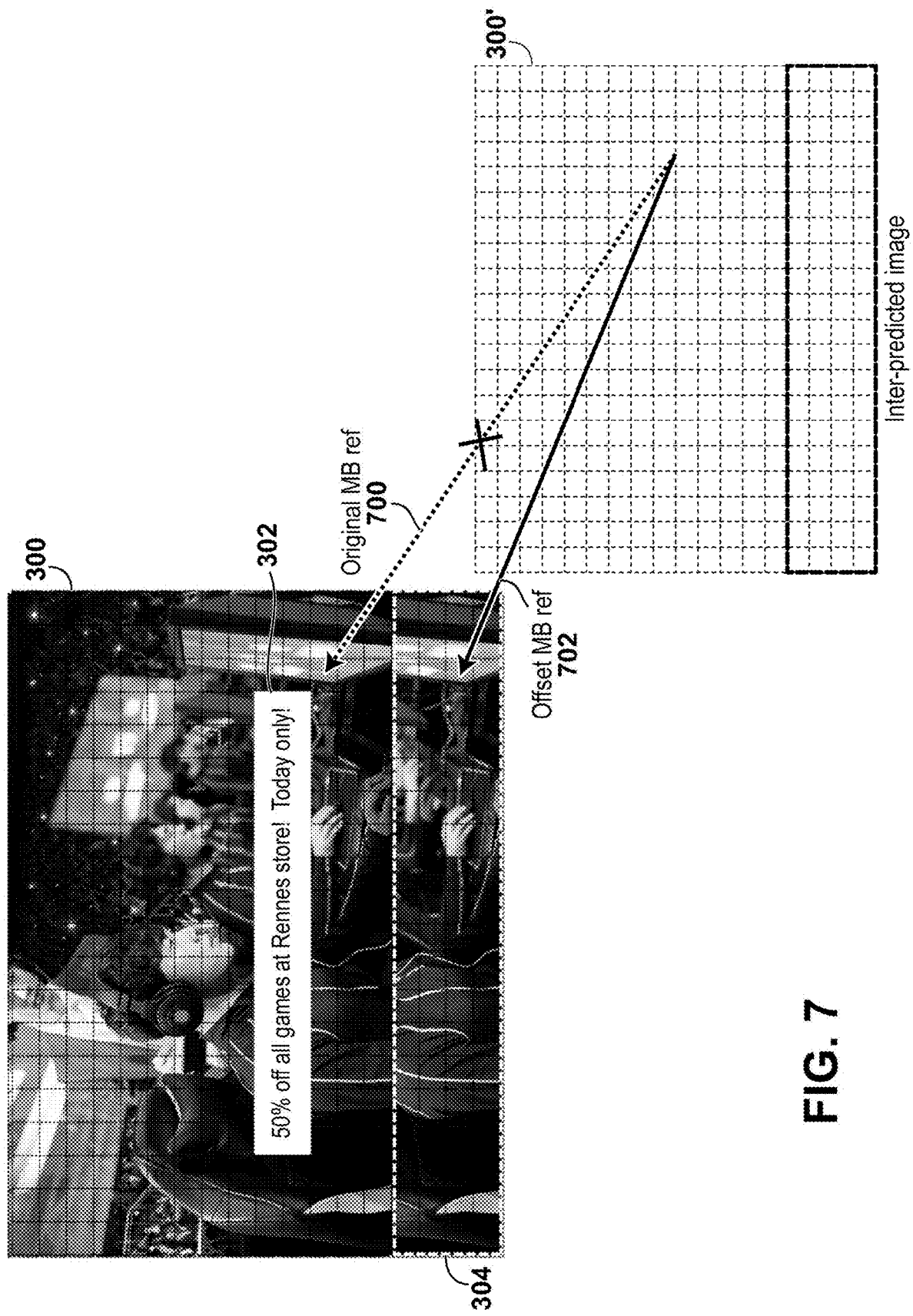
FIG. 7 is a schematic diagram that shows breaking a temporal reference, in accordance with an embodiment.

FIG. 7 depicts an example of such breaking and creating a reference, in accordance with an embodiment. In particular, FIG. 7 shows a frame 300 serving as a reference frame and an inter-coded frame 300' that refers to frame 300. Inter-coded frame 300' includes a reference 700 to a macroblock in insertion region 302 of frame 300, which is replaced by a reference 702 to the corresponding duplicated macroblock in duplication region 304 of frame 300. As will be appreciated, reference 702 is offset from reference 700 by the spatial displacement of the duplicated macroblock (inside duplication region 304) relative to the original macroblock (inside insertion region 302). Accordingly, reference 702 may be referred to as an offset macroblock reference.

To implement the above-described change to the macroblock reference, the following procedure may be used:

when a macroblock references a macroblock inside insertion region 302, its motion vector is updated to include an offset to reference the corresponding duplicated macroblock inside the duplication region 304; and when a macroblock is a skip macroblock with an estimated motion vector that references a macroblock inside insertion region 302, it is transformed into a macroblock with a motion vector that references the corresponding duplicated macroblock inside the duplication region 304.

As will be appreciated, the offset to be added to an original motion vector will be the same for all macroblocks that reference the same macroblock inside insertion region 302.

Inter-coded frame processor 112 also adjusts the temporal references for macroblocks in duplication region 304. For example, motion vectors of such macroblocks are adjusted to include an offset to refer to the original locations of macroblocks in a reference frame (outside of duplication region 304). Further, motion vector predictions and motion vector differences may be re-calculated for the first row of macroblocks in duplication region 304 as required to adjust macroblock syntax.

Electronic data store 114 may include a combination of non-volatile and volatile memory. In some embodiments, electronic data store 114 stores a plurality of macroblock replacement assets 116. In some embodiments, electronic data store 114 stores a Uniform Resource Locator (URL) or other unique identifiers/addresses for a plurality of macroblock replacement assets 116.

Each of encoder/decoder 102, insertion region definer 104, duplication region generator 106, content inserter 108, intra-coded frame processor 110, and inter-coded frame processor 112 may be implemented using conventional programming languages such as Java, J#, C, C++, C#, Perl, Visual Basic, Ruby, Scala, etc. These components of system 100 may be in the form of one or more executable programs, scripts, routines, statically/dynamically linkable libraries, or the like.

The operation of content insertion system 100 is further described with reference to the flowchart depicted in FIG. 8. System 100 performs the example operations depicted at blocks 800 and onward, in accordance with an embodiment.

At block 802, system 100 receives a frame 300 of video data encoded to include a plurality of macroblocks. Optionally, initial decoding (e.g., entropy decoding) may be performed by encoder/decoder 102. The data is decoded sufficiently to determine whether frame 300 is intra-coded or inter-coded.

At block 804, insertion region definer 104 of system 100 defines for frame 300 an insertion region 302 for inserting content. Insertion region 302 spans a subset of the macroblocks of frame 300.

At block 806, system 100 determines whether frame 300 is intra-coded or inter-coded. When system 100 determines that frame 300 is intra-coded, operation continues at block 808. Otherwise, when system 100 determines that frame 300 is inter-coded, operation continues at block 814.

At block 808, encoder/decoder 102 of system 100 performs partial intra decoding on frame 300, e.g., until the end of the macroblocks that need to be duplicated at block 810. Such macroblocks may include, for example, macroblocks inside insertion region 302 and macroblocks inside a margin around insertion region 302.

At block 810, duplication region generator 106 of system 100 augments frame 300 to include a duplication region 304 configured as a non-displayed region. Duplication region generator 106 populates duplication region 304 with macroblocks by duplicating macroblocks inside insertion region 302 and macroblocks inside a margin around insertion region 302.

At block 812, intra-coded frame processor 110 of system 100 breaks spatial references in frame 300. For example, intra-coded frame processor 110 may modify one or more macroblocks outside insertion region 302 to remove a spatial reference to inside insertion region 302.

At block 818, content inserter 108 of system 100 replaces the macroblocks of insertion region 302 with replacement macroblocks that encode replacement content.

Returning now to block 814, operation is described for when system 100 determines that frame 300 is inter-coded. At block 814, duplication region generator 106 of system 100 augments frame 300 to include a duplication region 304 configured as a non-displayed region. Duplication region generator 106 populates duplication region 304 with macroblocks by duplicating macroblocks inside insertion region 302 and macroblocks inside a margin around insertion region 302.

At block 816, inter-coded frame processor 112 of system 100 breaks temporal references in frame 300. For example, inter-coded frame processor 112 may modify one or more motion vectors referencing a macroblock of an insertion region of a reference frame to reference instead a corresponding duplicated macroblock of a duplication region of the reference frame.

Blocks 800 and onward may be repeated for each frame of a plurality of frames. For example, the plurality of frames may include each frame of a closed group of pictures.

Figure 8:
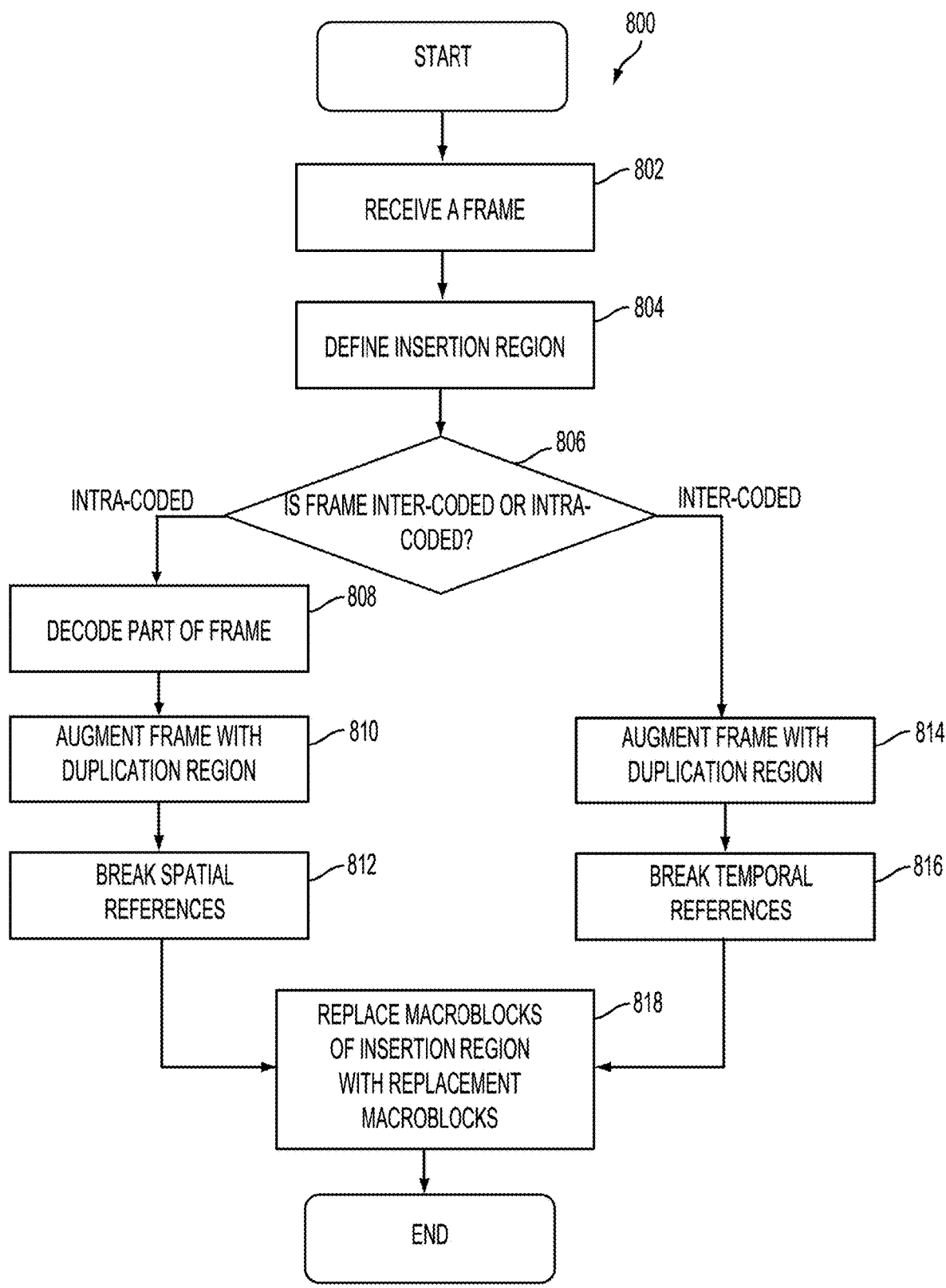
FIG. 8 is a flowchart of example operations performed at the content insertion system of FIG. 1, in accordance with an embodiment.

It should be understood that steps of one or more of the blocks depicted in FIG. 8 may be performed in a different sequence or in an interleaved or iterative manner. Further, variations of the steps, omission or substitution of various steps, or additional steps may be considered.

Figure 9:
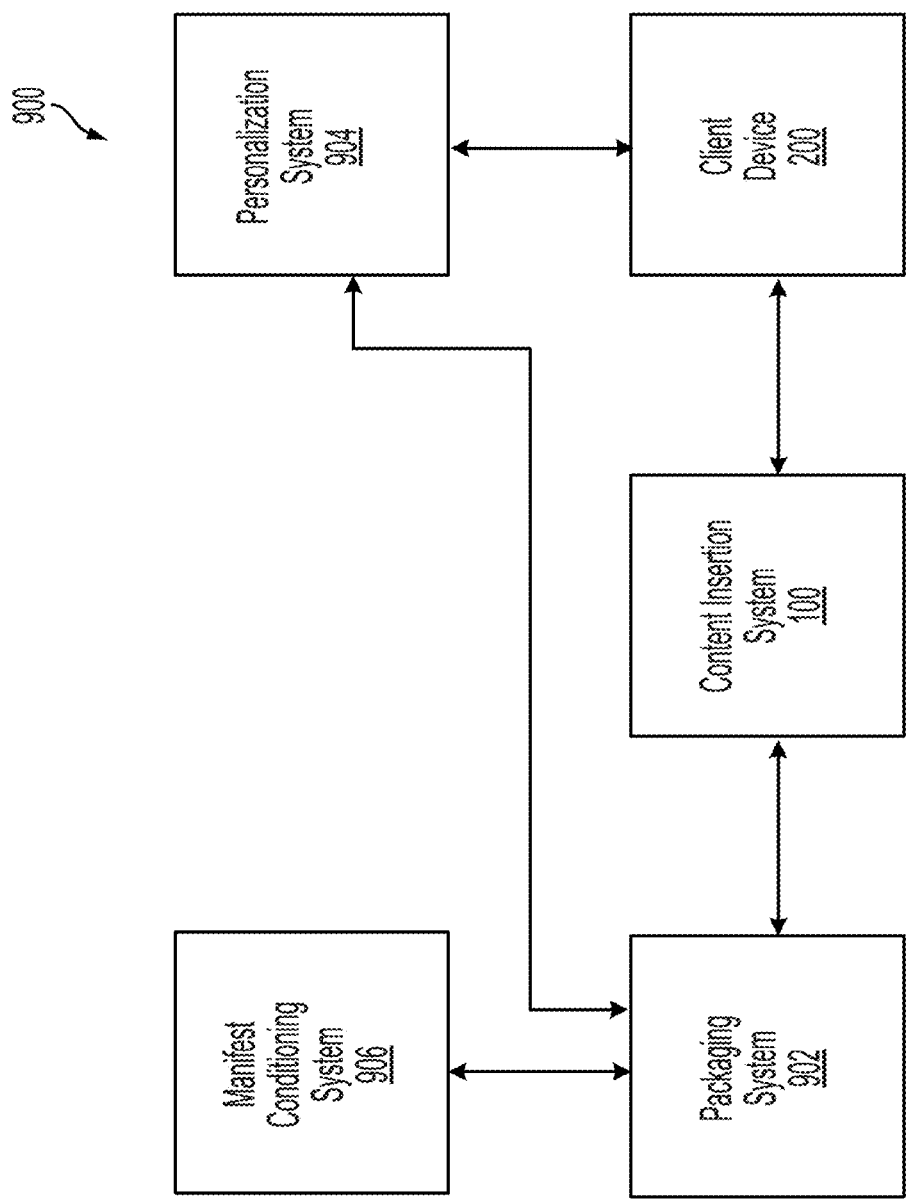
FIG. 9 is a schematic diagram of the content insertion system of FIG. 1 in an over-the-top media service environment, in accordance with an embodiment.

FIG. 9 shows an example application of content insertion system 100 in an over-the-top (OTT) media service environment 900, in accordance with an embodiment. Content insertion system 100 receives source content from packaging system 902, functioning as an origin server. Source content may be received in a variety of formats such as fragmented formats (e.g., MPEG-TS, MP4 or the like), and content fragments may be referred to as chunks. Content insertion system 100 may receive source content in encrypted form, which it decrypts for processing. Similarly, if required, content insertion system 100 may encrypt enriched content after content insertion. Accordingly, content insertion system 100 may include a suitable key management system. Content insertion system 100 may process content chunks automatically or based on commands received from a separate controlling system (e.g., personalization system 904 or packaging system 902).

Personalization system 904 receives a content request (i.e., a request for a manifest) from client device 200. In turn, personalization system 904 requests a manifest from packaging system 902. Packaging system 902 provides a manifest to manifest conditioning system 906 to condition the manifest, and then provides a conditioned manifest to personalization system 904.

Personalization system 904 may manipulate the manifest, e.g., to personalize it for a particular client device 200. Such manipulation may include, for example, modifying the manifest to include indicators of desired content insertion. For example, the manifest may be modified to specify particular macroblock replacement assets 116 (if any) to use for content insertion. For example, macroblock replacement assets 116 may be specified by a URL or other unique identifier/address. In some embodiments, the URL or other identifier may be made inaccessible to an end user (e.g., at client device 200), such that the inserted content cannot be blocked or avoided by the end user. In some embodiments, in the manifest, the identifier of a macroblock replacement asset 116 may be included as part of a URL for a particular content chunk (or segment) indicated in the manifest.

When content insertion system 100 receives a request for a content chunk from client device 200, content insertion system 100 retrieves a chunk corresponding to the source content from the origin server (e.g., packaging system 902), and decodes the chunk (e.g., using a MPEG2-TS demux processor). Content insertion system 100 also retrieves one or more macroblock replacement asset 116 (e.g., from electronic data store 114 or a remote component), and decodes such assets 116 as necessary.

Content insertion system 100 then generates enriched content by processing the source chunk to include data of the macroblock replacement asset 116, in manners disclosed herein. The enriched content is encoded (e.g., using a MPEG2-TS mux processor) to create content chunk which may be provided to client device 200. When content insertion system 100 generates enriched content responsive to request from client device 200, its operation may be referred to as a "just-in-time".

In the embodiments described above, content inserter 108 generates replacement macroblocks from prior created macroblock replacement assets 116. In other embodiments, content inserter 108 may generate replacement macroblocks with dynamically generated content rather than prior created content. Such replacement macroblocks may be generated using a combination of replacement content and source content. Such replacement macroblocks may be generated to provide certain effects for combining replacement content and source content such as transparency, smooth borders, blending, or the like. Such replacement macroblocks may be generated to include news or time-sensitive information that make prior creation of macroblock replacement assets impractical. In some embodiments, replacement macroblocks may be generated on a frame-by-frame basis. In some embodiments, replacement macroblocks may be generated in real-time or near real-time, e.g., as required for each frame into which replacement content is being inserted. When content inserter 108 generates replacement macroblocks with dynamically generated content, such replacement macroblocks may be generated to be intra-predicted macroblock or an inter-predicted macroblock, as appropriate.

Figure 10:
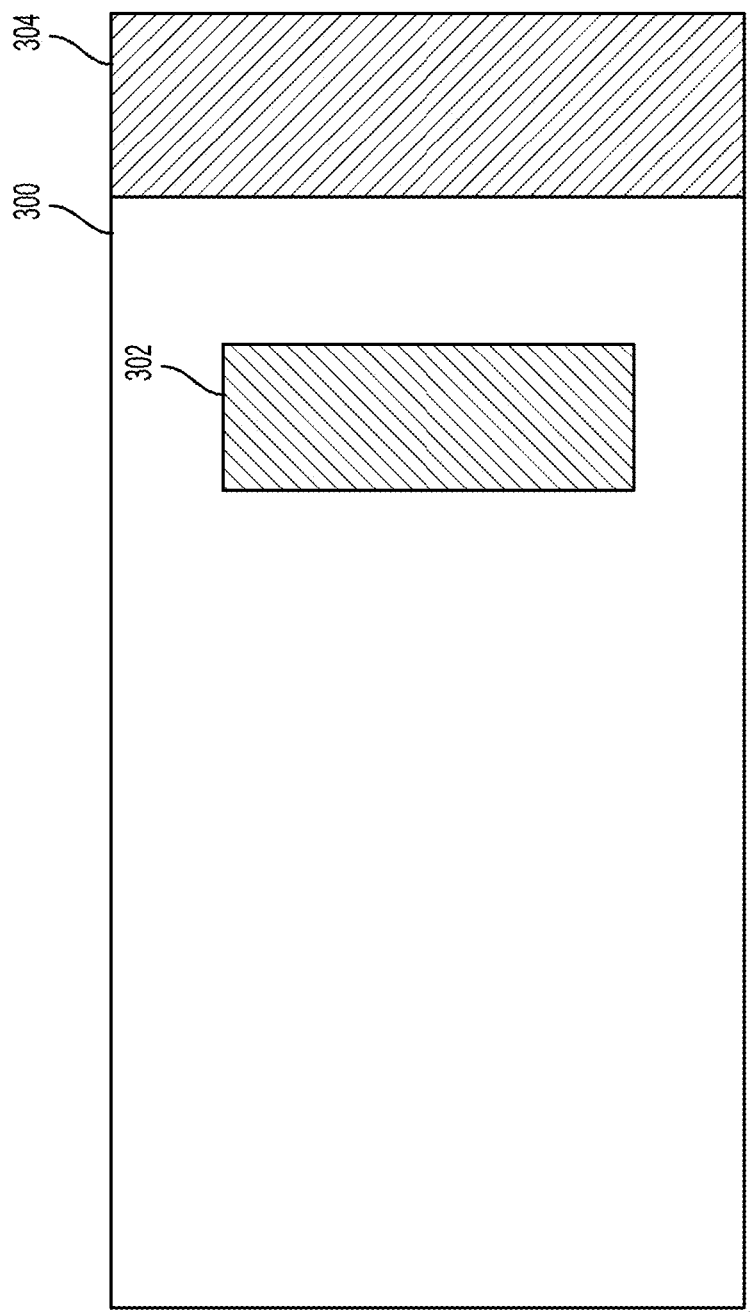
FIG. 10 is a schematic diagram of an alternative duplication region, in accordance with an embodiment.

In the embodiments described above, duplication region generator 106 modifies a frame 300 to provide a duplication region 304 at the bottom of the frame. However, as shown in FIG. 10, in other embodiments, duplication region generator 106 modifies a frame 300 to provide a duplication region 304 at the right of the frame.

In some embodiments, duplication region generator 106 may automatically select an appropriate location for the duplication region 304 based on various criteria. For example, duplication region generator 106 may automatically select an appropriate location for the duplication region 304 to minimize the size of the duplication region 304 while accommodating the macroblocks of the insertion region 302 and the adjacent macroblocks. For example, when insertion region 302 is a substantially horizontal region (as in FIG. 3), duplication region generator 106 may generate a duplication region 304 at the bottom of the frame spanning the width of frame 300. However, when insertion region 302 is a substantially vertical region (as in FIG. 10), duplication region generator 106 may generate a duplication region 304 at the right side of frame 300 spanning the height of frame 300.

In some embodiments, a duplication region 304 may also be generated at yet other locations of a frame 300. For example, in such embodiments, a duplication region 304 may be generated at the top of a frame 300 or at the left side of a frame 300.

In some embodiments, the method of generating enriched content disclosed herein is reversible, such that the source content may be substantially recovered upon processing the enriched content. Substantial recovery may provide content that is visually indistinguishable by a viewer from the source content, without needing to be bit-exact. Reversibility is provided because for both intra-coded frames and inter-coded frames, the original macroblocks of the source content are duplicated in duplication region 304. Thus, during a reversing method, these duplicated macroblocks may be moved back to insertion region 302, replacing the enriched content inserted by content insertion system 100.

In some embodiments, there be a small drift in exact pixel values as decoded in certain macroblocks over the duration of a group-of-pictures until the next intra-coded frame is encountered. Such drift may occur for macroblocks adjacent to insertion region 302, and may be caused by operation of a deblocking filter, a fractional sample interpolation filter, or the like.

Figure 11:
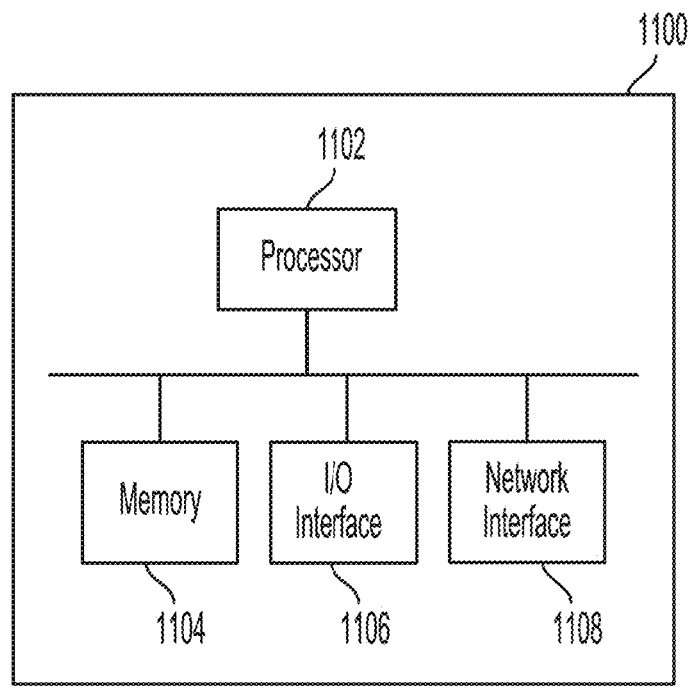
FIG. 11 is a schematic diagram for a computing device, in accordance with an embodiment.

FIG. 11 is a schematic diagram of computing device 1100 which may be used to implement content insertion system 100, in accordance with an embodiment.

As depicted, computing device 1100 includes at least one processor 1102, memory 1104, at least one I/O interface 1106, and at least one network interface 1108.

Each processor 1102 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1104 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1106 enables computing device 1100 to interconnect with one or more input devices, such as a keyboard, mouse, camera, touch screen and a microphone, or with one or more output devices such as a display screen and a speaker.

Each network interface 1108 enables computing device 1100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 1100 is shown but system 100 may include multiple computing devices 1100. The computing devices 1100 may be the same or different types of devices. The computing devices 1100 may be connected in various ways including directly coupled, indirectly coupled via a network, and distributed over a wide geographic area and connected via a network (which may be referred to as "cloud computing").

For example, and without limitation, a computing device 1100 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

In some embodiments, a computing device 1100 may function as a client device 200.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which may be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for inserting content into a video frame, the method comprising:
receiving a frame of video data encoded to include a plurality of macroblocks, wherein the frame of video data is encoded with block motion compensation;
defining an insertion region of the frame for inserting content, the insertion region spanning a subset of the plurality of macroblocks;
augmenting the frame with a duplication region configured as a non-displayed region, the duplication region including duplicated macroblocks that duplicate the macroblocks of the insertion region; and replacing the macroblocks of the insertion region with replacement macroblocks that encode replacement content.

2. The computer-implemented method of claim 1, further comprising:
upon detecting that the frame is an inter-coded frame, modifying a motion vector referencing a macroblock of an insertion region of a reference frame to reference instead a corresponding duplicated macroblock of a duplication region of the reference frame.

3. The computer-implemented method of claim 1, further comprising:
upon detecting that the frame is an intra-coded frame, modifying at least one of the macroblocks outside the insertion region to remove a spatial reference to within the insertion region.

4. The computer-implemented method of claim 1, further comprising setting a cropping parameter for the frame to configure the duplication region as a non-displayed region.

5. The computer-implemented method of claim 1, wherein the duplication region includes duplicated macroblocks that duplicate macroblocks in a margin around the insertion region.

6. The computer-implemented method of claim 1, wherein the duplication region is located at the bottom of the frame or on the right side of the frame.

7. The computer-implemented method of claim 1, wherein the duplication region has a height equal to a height of the frame or has a width equal to the width of the frame.

8. The computer-implemented method of claim 1, wherein the duplication region has at least one of: a height greater than a height of the insertion region or a width greater than a width of the insertion region.

9. The computer-implemented method of claim 1, reversing the replacing of the macroblocks of the insertion region to recover, substantially, the replaced macroblocks.

10. The computer-implemented method of claim 1, further comprising terminating decoding of the frame before reaching the end of the frame.

11. A computer-implemented system for inserting content into a video frame, the system comprising:
at least one processor;
memory in communication with said at least one processor;
software code stored in said memory, which when executed at said at least one processor causes the system to:
receive a frame of video data encoded to include a plurality of macroblocks, wherein the frame of video data is encoded with block motion compensation;
define an insertion region of the frame for inserting content, the insertion region spanning a subset of the macroblocks;
augment the frame with a duplication region configured as a non-displayed region, the duplication region including duplicated macroblocks that duplicate the macroblocks of the insertion region; and
replace the macroblocks of the insertion region with replacement macroblocks that encode replacement content.

12. The computer-implemented system of claim 11, wherein the software code when executed at the at least one processor further causes the system to:
upon detecting that the frame is an inter-coded frame, modify a motion vector referencing a macroblock of an insertion region of a reference frame to reference instead a corresponding duplicated macroblock of a duplication region of the reference frame.

13. The computer-implemented system of claim 11, wherein the software code when executed at the at least one processor further causes the system to:
upon detecting that the frame is an intra-coded frame, modify at least one of macroblocks outside the insertion region to remove a spatial reference to within the insertion region.

14. The computer-implemented system of claim 11, wherein the software code when executed at the at least one processor further causes the system to:
set a cropping parameter for the frame to configure the duplication region as a non-displayed region.

* * * * *